United States Patent

Yamaji et al.

[11] Patent Number: 5,820,105
[45] Date of Patent: Oct. 13, 1998

[54] DIAPHRAGM VALVE

[75] Inventors: Michio Yamaji; Kazuhiro Yoshikawa; Shigeru Itoi, all of Osaka, Japan

[73] Assignee: Fujikin Incorporated, Osaka, Japan

[21] Appl. No.: 670,169

[22] Filed: Jun. 27, 1996

[30] Foreign Application Priority Data

Jun. 30, 1995 [JP] Japan ................................. 7-166476

[51] Int. Cl.$^6$ ............................................................ F16K 7/17
[52] U.S. Cl. ............................................ 251/368; 251/331
[58] Field of Search ............................... 251/331, 368, 251/335.2

[56] References Cited

U.S. PATENT DOCUMENTS

| | | | |
|---|---|---|---|
| 5,186,434 | 2/1993 | Nishimura et al. ................... | 251/331 |
| 5,295,662 | 3/1994 | Yamaji et al. ......................... | 251/331 |
| 5,678,803 | 10/1997 | Shinohara et al. .................... | 251/368 |
| 5,730,423 | 3/1998 | Wu et al. ................................ | 251/331 |

*Primary Examiner*—Kevin Lee
*Attorney, Agent, or Firm*—Griffin, Butler Whisenhunt & Szipl, LLP

[57] ABSTRACT

In a diaphragm valve designed to seal with a metal diaphragm, corrosion resistance and strength of the diaphragm are improved by forming the diaphragm from a thin alloy sheet containing, by weight, 12.5–14.5% Mo, 20.0–22.5% Cr, 2.0–6% Fe, 2.5–3.5% W, 2.5% or less Co, 0.015% or less C, 0.08% or less Si, 0.50% or less Mn, 0.35% or less V, 0.02% or less P, 0.02% or less S and the remainder Ni. The thin alloy sheet is cold-rolled after annealing to enhance the strength of the diaphragm.

3 Claims, 2 Drawing Sheets

DIAPHRAGM VALVE

FIELD OF THE INVENTION

This invention relates to improvements in diaphragm valves of a type suitable for use in fluid pipe lines of, for example, semiconductor manufacturing plants, nuclear power plants, pharmaceutical and food manufacturing facilities, and the like. More specifically, the invention relates to a diaphragm valve having a metal diaphragm with improved corrosion resistance and mechanical strength as compared to metal diaphragms of the prior art.

BACKGROUND OF THE INVENTION

It is known to use direct touch type metal diaphragm valves in the pipe lines handling gases where high purity of the gases must be maintained. Such valves find use in the piping of semiconductor manufacturing facilities, nuclear power plants and pharmaceutical and food processing facilities because residual gas is easily purged from the valves hence high purity of a gas may be maintained even though different gases may be fed through the piping at different times. Japanese Patent Publication No. Hei 4-54104 discloses a direct touch metal diaphragm valve suitable for such use.

As shown in FIG. 2, a direct touch diaphragm valve comprises a body 20 having an inflow passage 20a, an outflow passage 20b, a valve chamber 20c and valve seat 20d. A metal diaphragm 21 is disposed in the valve chamber 20c so as to face the valve seat 20d. A bonnet 22 is mounted on the outer circumference of the diaphragm 21 and holds the circumference of the diaphragm 21 against the body 20 so that the diaphragm forms an airtight upper boundary of chamber 20c. A retaining nut 23 is screwed on to the body 20 and presses the bonnet 22 toward the body 20 thus clamping the peripheral edge of diaphragm 21 between the bonnet and the body. A threaded stem 24 engages internal threads on the bonnet 22 and a handle is provided for rotating the stem.

When the stem 24 is lowered, the center portion of the diaphragm 21 is elastically deformed and pressed downward to come into contact with the valve seat 20d so as to close the passage between the inflow passage 20a and the outflow passage 20b. When the stem 24 is raised, the elasticity of diaphragm 21 and/or fluid pressure in passage 20a returns the diaphragm to the position shown in FIG. 1 to thereby open the passage between the inflow passage 20a and the outflow passage 20b.

The diaphragm valve has excellent advantages in that it can improve the gas replaceability because the space volume of the valve chamber 20c may be made quite small. Furthermore, no sliding portions of valve members are located in the valve chamber 20c hence generation of particles, such as dust, resulting from wear, etc. is considerably reduced.

In semiconductor manufacturing processes, chlorine-based or fluorine-based reactive gas is frequently used. As long as the reactive gas is completely dry, no problem of corrosion occurs. However, in some situations traces of moisture enter the piping when the interior of the piping is brought into free communication with the atmosphere. The moisture entering the piping tends to collect at clearances or recesses in the diaphragm valve, generating concentrated acids such as hydrochloric acid or hydrofluoric acid when the moisture reacts with the reactive gases. The concentrated acids, in turn, corrode the interior portions of the diaphragms valve.

Consequently, in conventional diaphragm valves, members coming in contact with reactive gases are made of stainless steel and other materials which provide superb corrosion resistance. Particularly, metal diaphragm 21 which comes in direct contact with the reactive gases, is frequently made of stainless steel (for example, SUS 316L) which has outstanding corrosion resistance or corrosion-resistant alloys such as, for example, inconel 625 or 718.

However, since the diaphragm 21 is, in actual practice, formed as a super-thin sheet about 0.1 mm–0.2 mm thick, a problem exists in that the diaphragm is corroded in a comparatively short time and is readily perforated if any concentrated acid is formed on the diaphragm as described above.

Because the outer circumference of diaphragm 21 is squeezed and clamped between the body 20 and the bonnet 22, extremely complicated stress forces are exerted on the diaphragm 21 as it is pressed toward the valve seat 20d by the stem 24. As a result, when the diaphragm valve is repeatedly operated thousands of times, cracks are formed in the diaphragm thereby shortening the service life of the diaphragm. Furthermore, if the fluid being handled is corrosive, cracks or damage to the diaphragm 21 result in an extremely serious and hazardous condition.

SUMMARY OF THE INVENTION

An object of this invention is to solve the above problems.

An object of this invention is to provide a diaphragm valve having a metal diaphragm with improved corrosion resistance and strength.

Another object of the invention is to provide a diaphragm valve comprising a body having valve seat on a bottom surface of a concave valve chamber, the chamber being in free communication with an inflow passage and an outflow passage, a metal diaphragm disposed in the valve chamber and facing the valve seat, the metal diaphragm cooperating with the body to maintain air-tightness of the valve chamber, the diaphragm being elastically deformable to move toward or away from the valve seat, a bonnet secured to the body for holding an outer circumferential portion of the diaphragm against the body, and a stem extending through and slidably supported by the bonnet for elastically deforming the diaphragm, the diaphragm comprising a thin alloy sheet containing, by weight, 12.5–14.5% Mo, 20.0–22.5% Cr, 2.0–6.0% Fe, 2.5–3.5% W, 2.5% or less Co, 0.015% or less C, 0.08% or less Si, 0.50% or less Mn, 0.35% or less V, 0.02% or less P, 0.02% or less S and the remainder Ni, the thin alloy sheet being cold-rolled after annealing.

Still another object of the invention is to provide a diaphragm for a diaphragm valve, the diaphragm comprising a thin alloy sheet containing, by weight 12.5–14.5% Mo, 20.0–22.5% Cr, 2.0–6.0% Fe, 2.5–3.5 W, 2.5% or less Co, 0.015% or less C, 0.08% or less Si, 0.50% or less Mn, 0.35% or less V, 0.02% or less P, 0.02% or less S and the remainder Ni, the thin sheet being cold-rolled after annealing.

A further object of the invention is to provide a method of making a metal diaphragm for a valve, the method comprising forming a thin alloy sheet having a composition by weight, of 12.5–14.5% Mo, 20.0–22.5% Cr, 2.0–6.0% Fr, 2.5–3.5% W, 2.5% or less Co, 0.015% or less C, 0.08% or less Si, 0.50% or less Mn, 0.35% or less V, 0.02% or less P, 0.02% or less S and the remainder Ni; annealing the thin alloy sheet; subsequent to the annealing, cold rolling the annealed alloy sheet; and, shaping the diaphragm from the cold rolled sheet.

Other objects and advantages of the invention will become evident upon consideration of the following description and the accompanying drawings.

DESCRIPTION OF PREFERRED EMBODIMENTS

Figure 1:
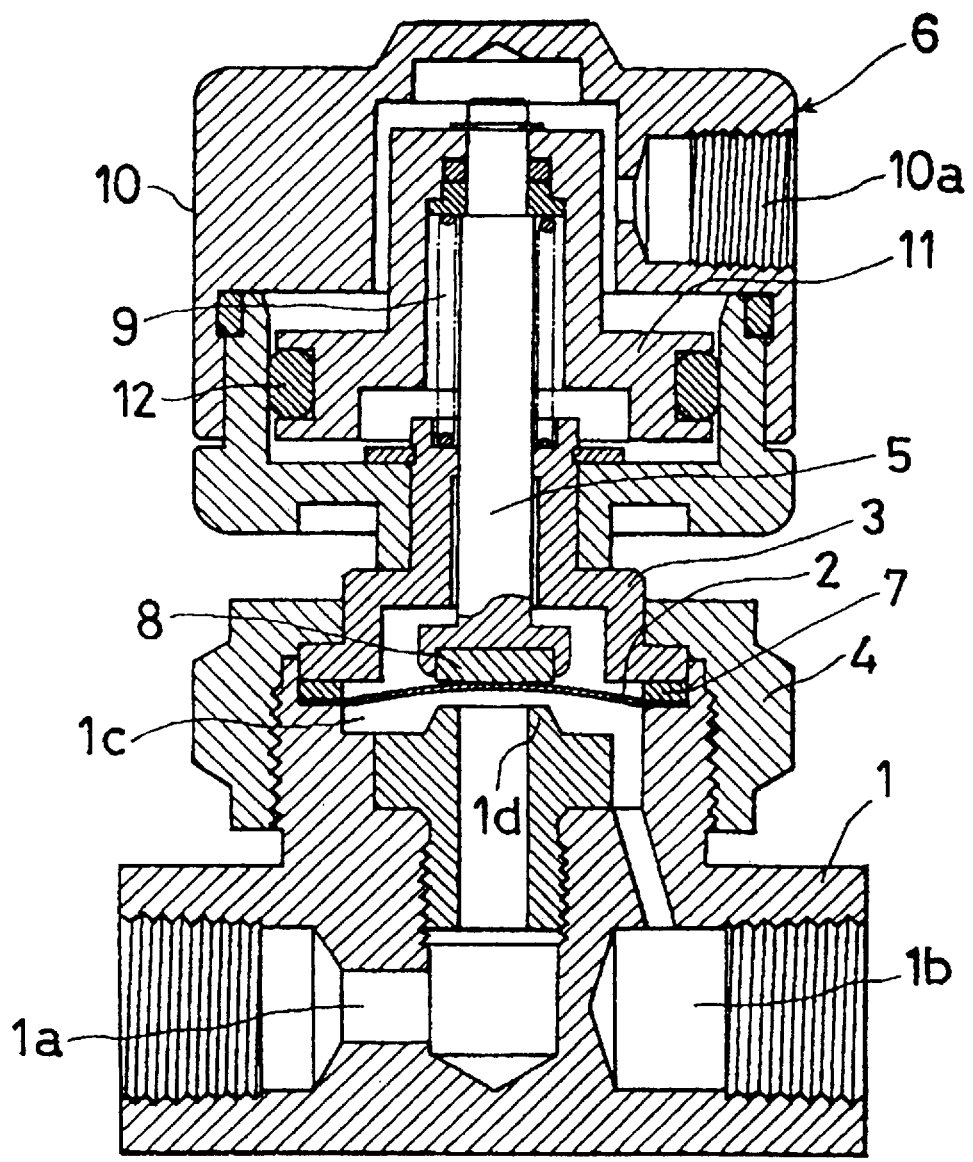
FIG. 1 is a longitudinal sectional view showing a diaphragm valve according to this invention.
Figure 2:
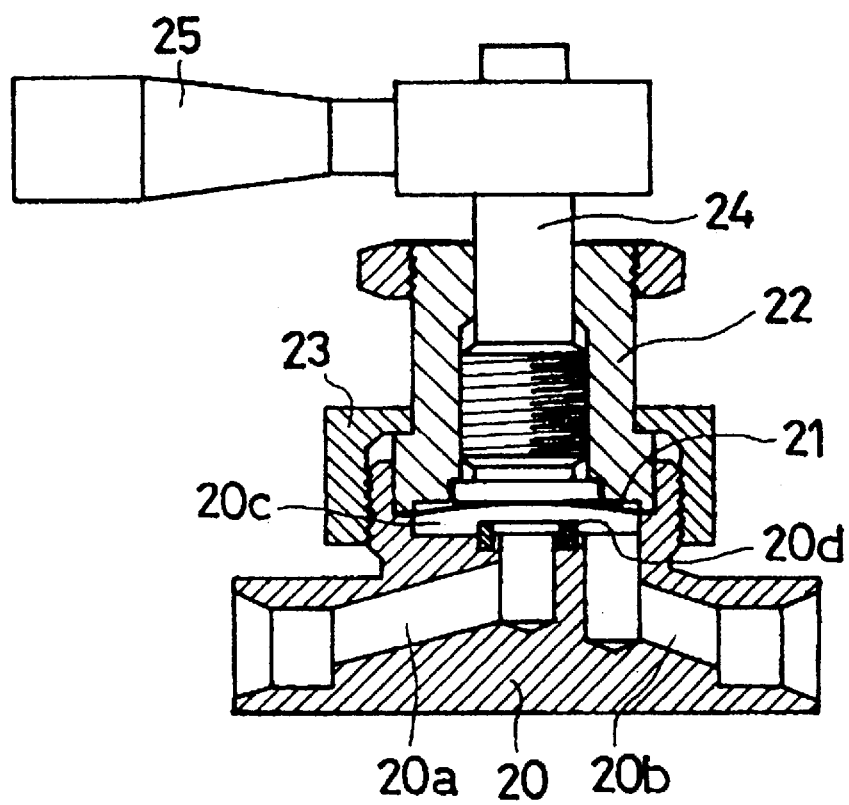
FIG. 2 is a longitudinal sectional view showing a conventional diaphragm valve.

FIG. 1 is a longitudinal sectional view of a normally open direct touch diaphragm valve according to one embodiment of the invention. The diaphragm valve comprises a body 1, a metal diaphragm 2, a bonnet 3, a bonnet nut 4, a stem 5 and a fluid pressure actuator 6.

The body 1 is made of stainless steel (for example, SUS 316L, etc.) and has formed therein a concave valve chamber 1c in free communication with an inflow passage 1a and an outflow passage 1b. The bottom of the valve chamber is provided with a valve seat 1d and the diaphragm 2 is arranged in the valve chamber so as to face the valve seat.

The valve seat 1d is made of stainless steel or synthetic resin (for example, tetrafluoroethylene resin, etc.) and is screwed inside the body 1. In FIG. 1 the valve seat 1d is made separately from the body 1, but the valve seat may be formed integral with the body 1.

The diaphragm provides an airtight seal for the valve chamber 1c and at the same time is elastically deformable in the vertical direction so as to move into contact with, or move away from the valve seat 1d. The stainless steel bonnet 3 is mounted over the outer circumference of the diaphragm 2 and holds the outer circumference of the diaphragm 2, via a gasket 7, against the body 1. The stainless steel bonnet nut 4 is screwed onto the body 1 and presses the bonnet 3 toward the top of body 1. Stainless steel stem 5 extends through, and is slidably supported by, the bonnet 3. A diaphragm presser 8, made of either synthetic resin (for example, tetrafluoroethylene resin, etc.) or synthetic rubber, is fitted to the lower end of the stem 5. A coil spring 9 rests on the upper surface of bonnet 3 and urges the stem 5 upwardly. The fluid pressure actuator 6, which may be a pneumatic actuator, is fixed to the top of the bonnet 3 with the top of the stem 5 protruding from the bonnet 3 and being housed inside the actuator. The actuator comprises a cylinder 10 having an inlet port 10a through which operating air is applied to the actuator, a piston 11 secured to the top end of the stem 5 for up and down movement inside the cylinder 10, and an O-ring 12 which is fitted to the outer circumferential surface of the piston and slides vertically on the inner circumferential surface of the cylinder.

In FIG. 1, the pneumatic actuator 6 is used as a driving source, but the valve driving source may be an electrically-operated actuator such as a solenoid, motor, etc., a fluid-pressure-operated actuator utilizing oil pressure or gas pressure, or even a manual actuator.

When operating air is applied to the cylinder 10 through inlet port 10a, the pressure forces piston 11 and stem 5 downward against the elastic force of coil spring 9, and the center portion of the diaphragm 2 is pressed downwards by the presser 8 on the bottom of stem 5. As a result, the diaphragm 2 comes into contact with the valve seat 1d and the passage between the inflow passage 1a and the outflow passage 1b is closed (valve closed condition).

When the supply of operating air is stopped and pressure inside the cylinder 10 is released, the piston 11 and the stem 5 are raised by the elastic force of the coil spring 9, and as the piston and the stem rise, the diaphragm 2 returns to its original shape because of its elasticity and the fluid pressure inside the chamber 1c. As the diaphragm moves way from the valve seat 1d, the inflow passage 1a and the outflow passage 1b are brought into free communication (open condition).

The diaphragm 2 is made of an alloy material comprising, by weight, 12.5–14.5% Mo, 20.0–22.5% Cr, 2.0–6.0% Fe, 2.5–3.5% W, 2.5% or less Co, 0.015% or less C, 0.08% or less Si, 0.50% or less Mn, 0.35% or less V, 0.02% or less P, 0.02% or less S, and the remainder Ni.

The diaphragm is made as follows. A thin sheet (hoop material) of the alloy material having a suitable thickness is annealed by heating it to 150°–200° C. for an interval of, for example, 5 to 10 minutes. The sheet of alloy material is then slow cooled.

The thin sheet of alloy material is annealed because when a thin sheet is manufactured by cold rolling, crystal grains are extended in the working direction as working proceeds and grow gradually harder, thus making the work difficult. Annealing is necessary to temporarily soften the crystal grains.

Next, the annealed and cooled sheet of alloy material is cold rolled. The cold rolling is carried out at the working ratio of 10–40% so that a thin sheet 0.1 mm–0.2 mm thick (thickness tolerances: ±0.01–0.015) having a surface hardness MHV 370–430 is obtained.

Cold rolling the thin sheet increases the hardness of the thin sheet, and improves tensile strength, yield point, elastic limit, and proportional limit. That is, the hardness and strength of the diaphragm 2 obtained from the thin sheet increase. The surface of the diaphragm 2 is cold-rolling finished.

Following the cold rolling, the diaphragm 2 is obtained by forming the thin sheet into a circular concave or disk-like shape. As shown in FIG. 1, the diaphragm is positioned within the valve body with the bulging center portion of the diaphragm facing upwardly.

The mechanical and physical properties of the diaphragm 2 formed from the thin sheet are: about 550N/mm$^2$ for tensile strength, about 180N/mm$^2$ for 0.2% yield strength, about 40% elongation, about 400 for hardness MHV, about 20×10$^3$ kg/mm$^2$ for modulus of longitudinal elasticity, and 5×10$^3$ kg/mm$^2$ for modulus of transverse elasticity.

In the alloy for the diaphragm, Mo improves the corrosion resistance in a reducing atmosphere as well as the pitting resistance and crevice corrosion resistance to chloride. Corrosion resistance is exhibited when the alloy contains more than about 12.5% Mo. When the percentage of Mo in the alloy exceeds 14.5%, the hot workability and machinability of the alloy decrease. Therefore, the alloy should contain Mo in the amount of 12.5–14.5% by weight.

Cr is added to improve the corrosion resistance and strength. When the Cr content exceeds 20% in a Ni based material, improved corrosion resistance is exhibited. On the other hand when the Cr content exceeds 23%, the ductility of the alloy is degraded and the workability is reduced. Therefore, the alloy should contain Cr in the amount of about 20.0–22.5% by weight.

Fe is an element which impairs corrosion resistance but is necessary for improving machinability. The addition of about 2% Fe can improve the machinability and if the Fe content is less than about 6%, there is no special problem in corrosion resistance. Consequently, the content of the Fe alloy should be 2.0–6.0% by weight.

Similar to Mo, W is effective in improving corrosion resistance in a reducing atmosphere, and adding a proper amount of W results in a remarkably improved corrosion resistance and is very effective for improving strength at high temperature. However, since an excessive addition of W embrittles the material forming the diaphragm 2, it is necessary to determine the addition amount in balance with other elements. The addition of 2.5–3.5% by weight results in improved corrosion resistance and high-temperature strength without making the alloy excessively brittle.

Co is added primarily for improving mechanical strength, fatigue resistance, hardness and elasticity, but when the Co content exceeds 2.5%, cold workability drastically decreases.

C combines with Cr to form Cr carbide and lowers corrosion resistance. Therefore, the less, the better. However, if it is 0.015% or less, no particular problem occurs in regard to corrosion resistance.

Same as C, Si is restricted to be 0.08% or less in order to suppress deposition of carbide resulting from thermal influence by welding. In this regard, it is contemplated that a diaphragm according to the present invention may have a center opening formed therein with a valve closure disk extending through the opening and being welded to the inner circumference of the diaphragm.

Mn, V, P, and S are restricted to 0.50% or less, 0.35% or less, 0.02% or less, and 0.02% or less, respectively, from the viewpoint of corrosion resistance, mechanical strength, and workability.

Ni is an element which is thoroughly solid-soluble with Mo and Cr. The Ni improves corrosion resistance and strengthens the alloy.

Corrosion resistance tests were carried out on the diaphragm 2 described above and conventional (stainless steel or inconel) diaphragms. The test results indicate that the diaphragm 2 provides a far better corrosion resistance than the conventional diaphragms.

Comparative tests also show that the diaphragm valve according to this invention is extremely superior to conventional diaphragm valves with respect to durability and strength. When conventional diaphragm valves were repetitively operated thousands of times, cracks formed on the diaphragms. On other hand, the diaphragm valve according to this invention did not crack and was not damaged when it was repetitively operated 10,000 times.

From the foregoing description it is seen that a diaphragm formed from a highly corrosion-resistant thin alloy sheet having the composition described above has a corrosion resistance that is greatly improved as compared to that of conventional diaphragm valves.

The thin sheet which forms the diaphragm has its strength improved by work hardening because it is cold-rolled after annealing. That is, the thin sheet gains an enhanced hardness by cold rolling, and provides improved tensile strength, yield point, elastic limit, and proportional limit. As a result, the durability of the diaphragm is greatly improved and no cracking or damage occurs even after the diaphragm is operated tens of thousands of times.

Although a preferred embodiment of the diaphragm and diaphragm valve have been described by way of illustration, various modifications and substitutions may be made in the described embodiment without departing from the spirit and scope of the invention. For example, the diaphragm 2 may comprise two or more very thin metal sheets superimposed one upon another. The diaphragm need not come into direct contact with valve seat 1d. Instead, a valve closure disk may be positioned below diaphragm 2 for contacting the valve seat, but in this arrangement a bias spring must be provided to bias the closure disk upwardly. In another arrangement a valve closure disk may extend through an opening in the center of the diaphragm to contact the valve seat, the disk being fixed to the inner circumference of the diaphragm in an air-tight manner, such as by welding.

What is claimed is:

1. A diaphragm valve comprising a body having valve seat on a bottom surface of a concave valve chamber, the chamber being in free communication with an inflow passage and an outflow passage, a metal diaphragm disposed in the valve chamber and facing the valve seat, the metal diaphragm cooperating with said body to maintain airtightness of the valve chamber, said diaphragm being an elastically deformable body movable toward or away from the valve seat, a bonnet secured to the body for holding an outer circumferential portion of the diaphragm against the body, and a stem extending through and slidably supported by the bonnet for elastically deforming the diaphragm, wherein said diaphragm comprises a thin alloy sheet containing 12.5–14.5% Mo, 20.0–22.5% Cr, 2.0–6.0% Fe, 2.5–3.5% W, 2.5% or less Co, 0.015% or less C, 0.08% or less Si, 0.50% or less Mn, 0.35% or less V, 0.02% or less P, 0.02% or less S and the remainder Ni by weight, the said thin alloy sheet being cold-rolled after annealing.

2. A diaphragm valve according to claim 1 wherein the thin alloy sheet is annealed at 150°–200° C. for 5–10 minutes and then slow-cooled.

3. A diaphragm valve according to claim 1 wherein the thin alloy sheet is cold-rolled to produce the thin sheet 0.1–0.2 mm thick at the working ratio of 10–40%.

* * * * *